W. C. FARNUM.
ART OF MAKING GEAR CUTTERS.
APPLICATION FILED DEC. 2, 1919.

1,383,707.

Patented July 5, 1921.

Inventor:
William C. Farnum
by Robt. P. Harris.
Attorney

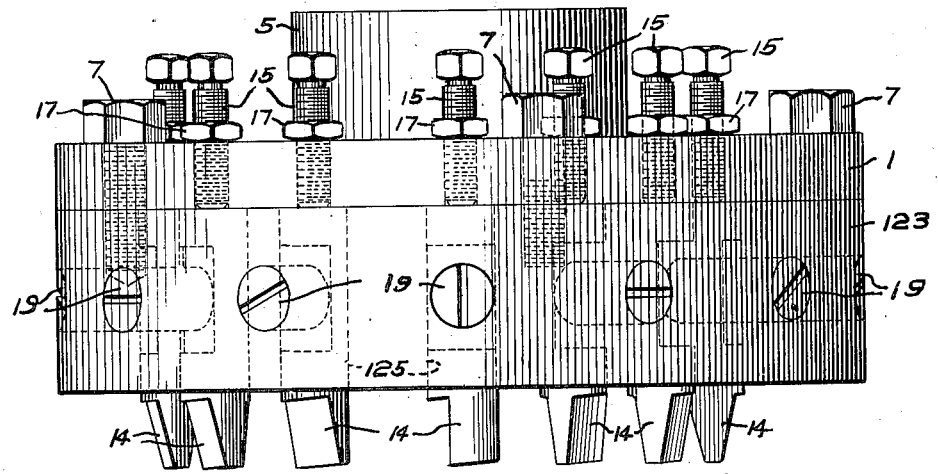
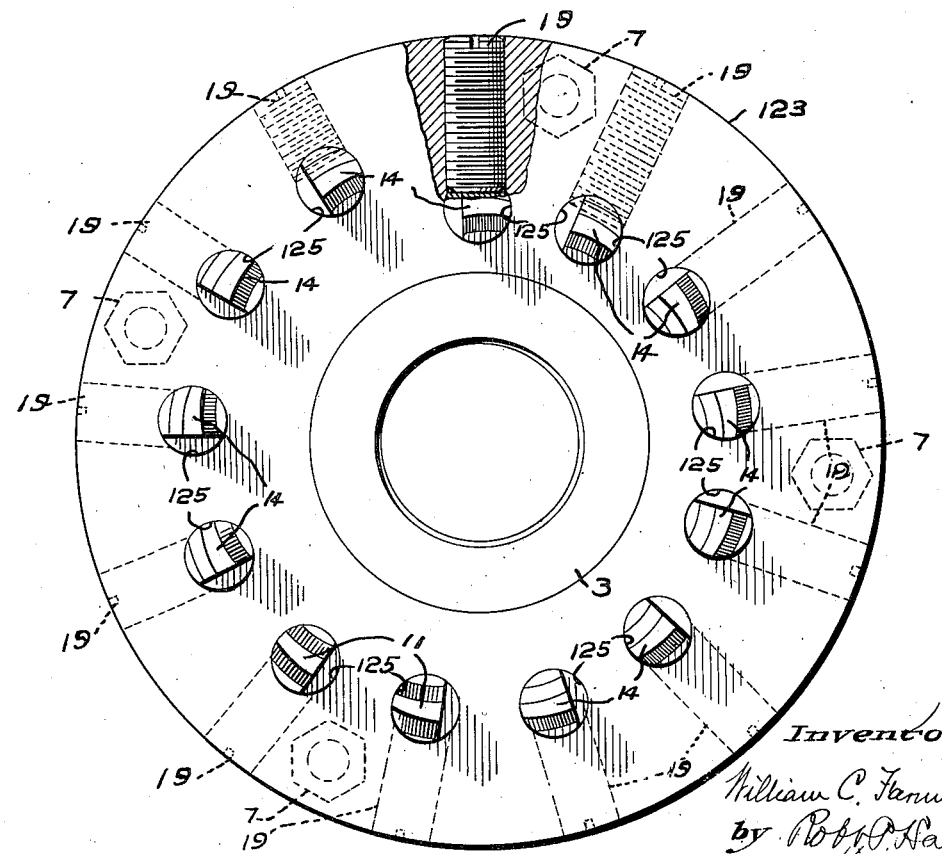

W. C. FARNUM.
ART OF MAKING GEAR CUTTERS.
APPLICATION FILED DEC. 2, 1919.
1,383,707.
Patented July 5, 1921.
4 SHEETS—SHEET 3.
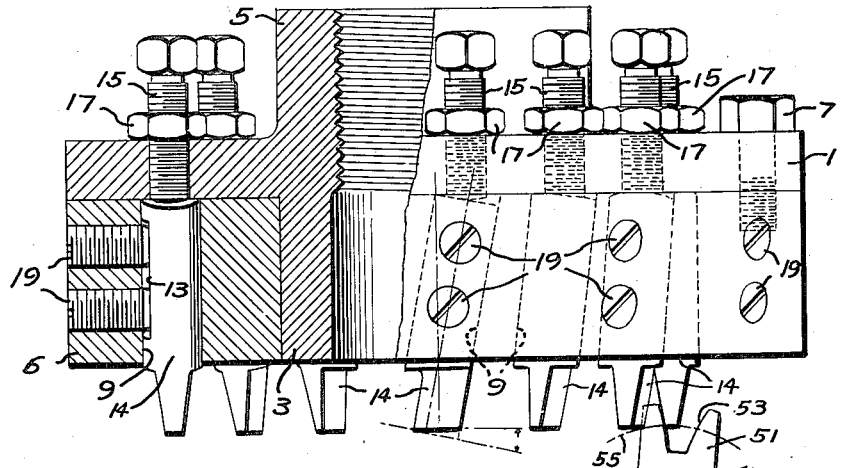
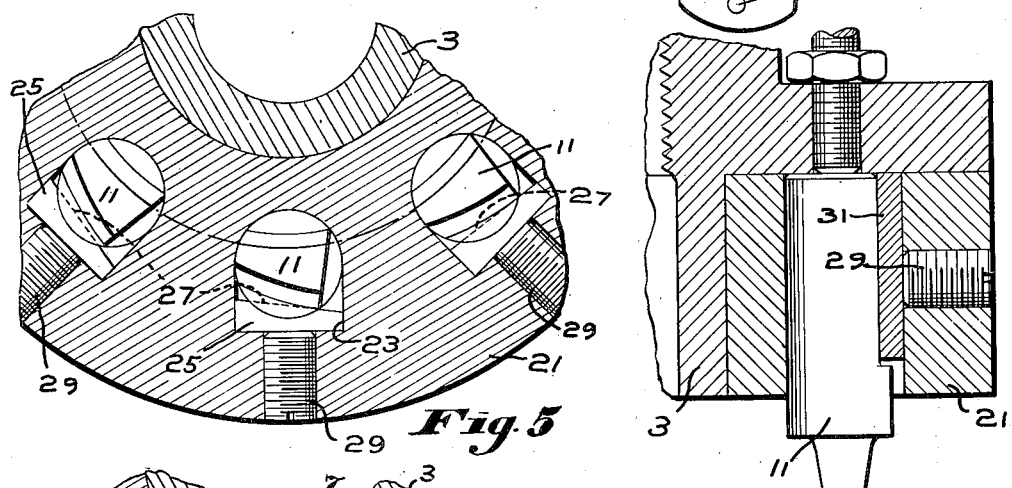
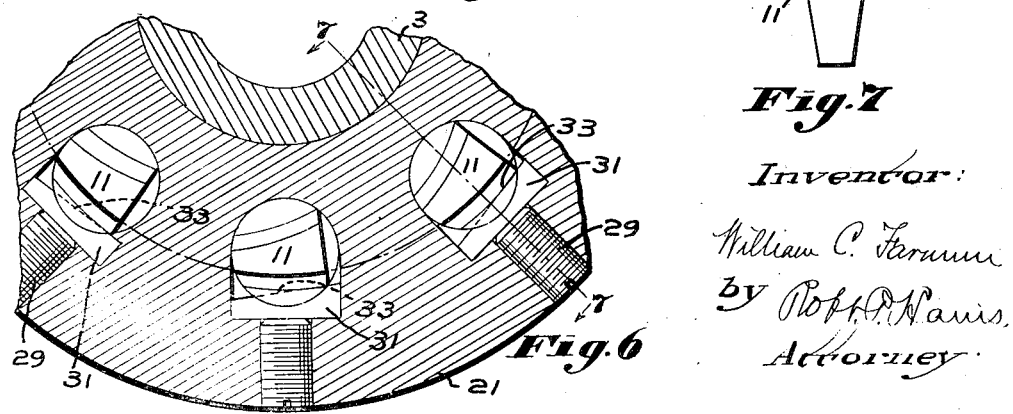

W. C. FARNUM.
ART OF MAKING GEAR CUTTERS.
APPLICATION FILED DEC. 2, 1919.
1,383,707.
Patented July 5, 1921.
4 SHEETS—SHEET 4.
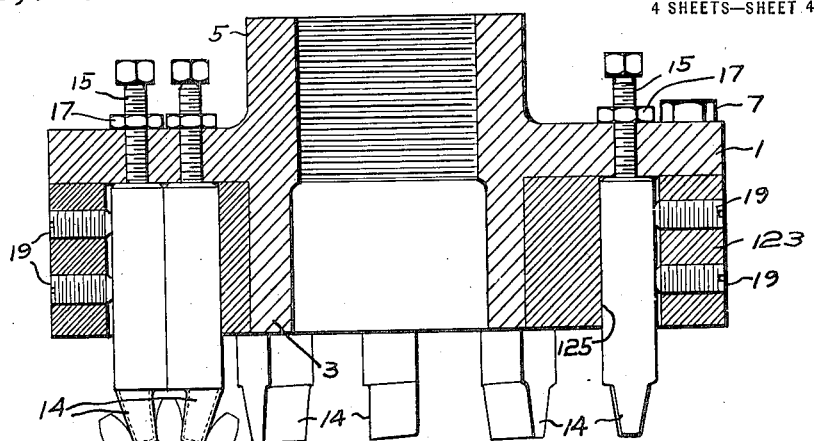
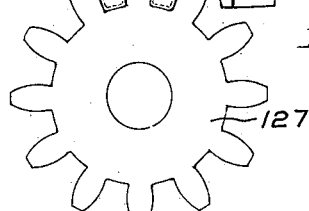
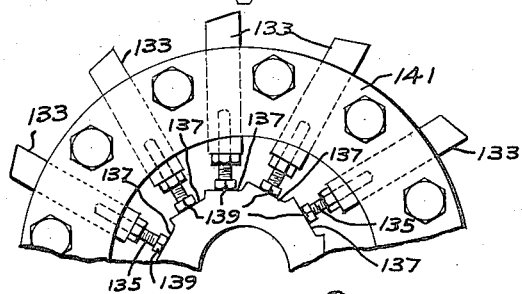
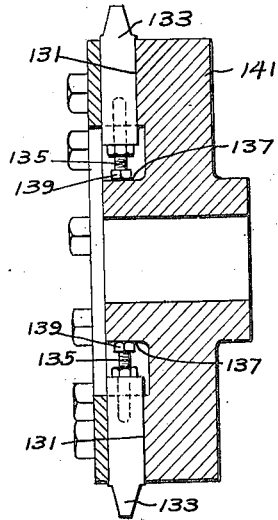
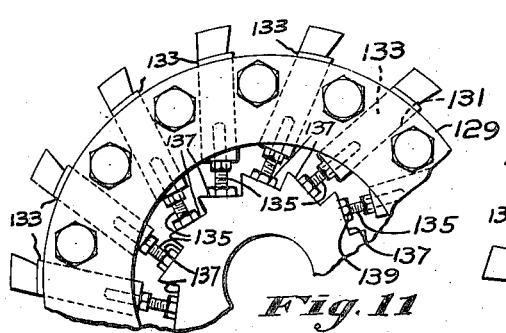
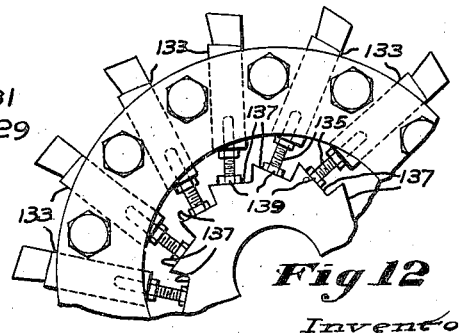

UNITED STATES PATENT OFFICE.

WILLIAM C. FARNUM, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS.

ART OF MAKING GEAR-CUTTERS.

1,383,707. Specification of Letters Patent. Patented July 5, 1921.

Application filed December 2, 1919. Serial No. 341,875.

*To all whom it may concern:*

Be it known that I, WILLIAM C. FARNUM, a citizen of the United States, residing at Winchendon, in the county of Worcester and State of Massachusetts, have invented an Improvement in the Art of Making Gear-Cutters, of which the following description, in connection with the accompanying drawings, is a specification, like characters on the drawings representing like parts.

The invention hereinafter described relates to the art of making cutters for shaping the teeth of gears, and more particularly to a method of shaping the teeth of cutters, and teeth of gears produced by such cutters.

It is necessary that the teeth of the cutter should be formed with sufficient rake or clearance at the ends thereof and opposed profiles thereof to prevent the heels of the cutting teeth from dragging along and coming in contact with the work. One of the purposes of the present invention is to provide simple and efficient methods for giving the ends and opposed profiles of the teeth of cup or scroll cutters the required rake or clearance.

The rake or clearance of the cutter teeth of a scroll or cup cutter may be produced by holding the cutter teeth in positions in a head oblique to the axis of the head during the shaping of the teeth by the tool; and then mounting these teeth in the gear cutting head, in a position parallel to its axis, so that the teeth will have a clearance or rake back of their cutting edges, produced by the change in their setting angle.

If it is desired to dress the teeth of spur gear cutters, the teeth may be held in a head in positions slightly inclined from radii perpendicular to the axis of the head, while being dressed or formed with proper clearance, and then the teeth may be reversed so that their faces will turn to the opposite direction, and they will then have the proper clearance for their operation in forming spur gear teeth on a blank.

Another purpose of the invention is to provide a cutter tooth generating tool or cutter having a tooth space suitably formed with an active cutting edge for dressing down or reducing the active portions of the cutter teeth to final form.

In carrying this feature of the method into practical effect, the cutter teeth may be mounted in a head and rotated by a suitable mechanism relatively to the tooth forming tool so as to cause the teeth progressively to move past and be acted upon by said tool. The latter may simultaneously be given a rotary motion to produce cutting teeth of appropriate form for producing gear teeth having involute profiles. Different tooth forming tools are used according to the size of gear desired to be produced in the use of the cutter shaped by the forming tool. The radius of the pitch circle of the forming tool will equal the radius of the pitch circle of the gear to be produced in the use of the cutter formed by said tool. These teeth are reduced accurately to final form, and therefore, when used in cutting teeth on a gear blank, the spaces between the teeth on the blank will have a form accurately corresponding to the shape of the active cutting portion of the tooth space of the forming tool. Thus, by this simple method, a forming tool can be selected having the tooth space desired to be produced in the blank, and a cutter may be readily formed for producing such tooth spaces in the blank.

When the teeth of the cutter are mounted in the head in spiral disposition, they will lie at different radial distances from the axis of the head, but since they are formed by progressively passing the same forming tool, the angle of the active cutting end portion of the teeth and the shape of the teeth will progressively vary from the tooth nearest the axis of the head to the tooth furthest therefrom.

In some instances it may be desired to use the forming tool in the production of cup cutters which have their teeth located on a head at equal distances from the axis of the head. In such cases the forming tool has a space with a cutting edge of the same contour as the cutter tooth desired.

With the aforesaid and other objects in view, the character of the invention will be best understood by the following description of the method and one good form of mechanism by the use of which the method may be practised, said mechanism being shown in the accompanying drawings, wherein:

Figure 1 is a perspective view of one good form of machine which may be used in the practice of the method embodying the invention;

Fig. 1ᵃ on an enlarged scale is a perspective view of the forming tool;

Fig. 2 is a side elevation of a cutter made by the method;

Fig. 3 is a face view of the cutter shown in Fig. 2, a portion being broken away to disclose parts beyond the same;

Fig. 4 is a view partly in side elevation and partly in section of the cutter head shown in Figs. 2 and 3 but provided with a different ring for carrying the cutter teeth while being reduced to final form with proper rake or clearance;

Fig. 5 is a sectional view of a segment of a different form of head provided with means to secure the teeth in proper position to be reduced to give clearance to the concave profiles of the teeth;

Fig. 6 is a sectional view of a segment of the latter head provided with means to secure the teeth in proper position to be reduced to give clearance to the convex profiles of the teeth;

Fig. 7 is a section taken on line 7—7 of Fig. 6;

Fig. 8 is a sectional view of still another form of head and shows the relation of the spiral cutter to a gear in forming the teeth of the latter;

Fig. 9 is a view of a spur gear cutter having teeth formed with rake or clearance;

Fig. 10 is a section through the cutter shown in Fig. 9;

Fig. 11 is a view of a portion of a head of a spur gear cutter having teeth mounted therein in position to be dressed with rake or clearance; and Fig. 12 is a view of the cutter shown in Fig. 11 with the cutter teeth reversed and in readiness to cut teeth of spur gears.

Figure 1:
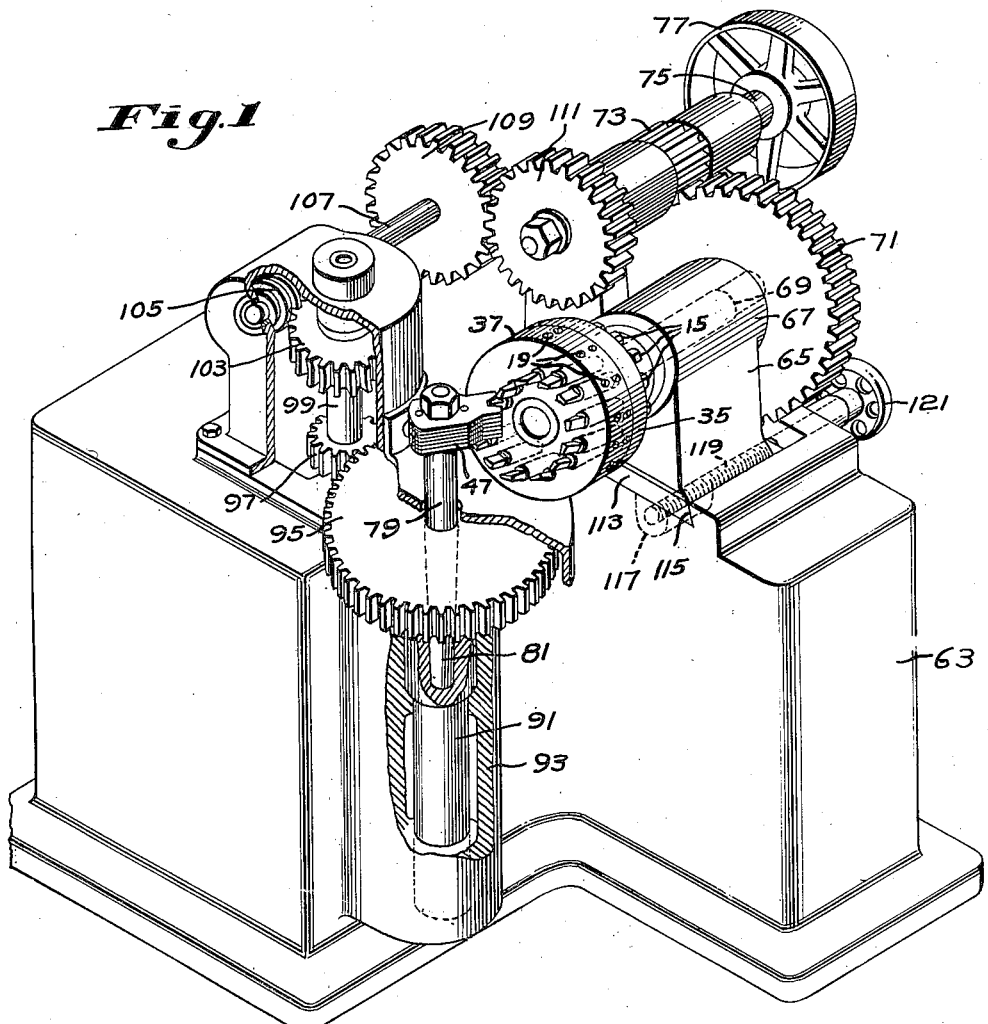
Figure 1A:
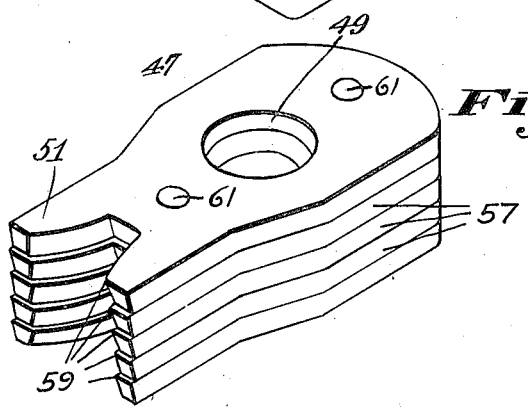

Referring to the drawings, the invention contemplates that the active cutting end portions of the teeth shall be formed with a rake or clearance to prevent the heels of said end portions from dragging along or coming in contact with the work. To accomplish this by one method, a head 1 (Fig. 4) may be provided having a front hub 3 and a rear hub 5 internally threaded to permit the same to be screwed onto the spindle of a machine to be described. Encircling and fitting on the front hub 3 is a ring 6 secured to the head 1 by screw bolts 7 disposed at suitable intervals. This ring is adapted to carry the teeth, and for this purpose the ring may be provided with a series of holes or sockets 9 sufficient in number to accommodate the number of teeth required. The axes of these sockets are inclined with respect to the axis of the head, in order to dispose the teeth in inclined position. The angle of inclination will vary according to the amount of clearance desired at the end portions of the teeth.

In the present instance, the teeth are inclined at an angle of about 8 degrees with respect to the axis of the head. Mounted in these sockets are a series of teeth 11 having rounded shanks, and having slabbed off faces or sides 13 and end portions 14 tapered or reduced to approximate final form. With this construction a square socket and a square shanked tooth such as shown in Fig. 8 may be used, if desired. To limit the inward movement of the teeth, adjusting screws 15 may be provided, mounted in threaded bores in the head 1 registering with the sockets 9, said screws being held in different positions of adjustment by lock nuts 17. To hold the teeth in their sockets, holding screws 19 may be provided threaded into the ring 5 and adapted to engage the slabbed off faces, or flat sides 13 of the shanks of the teeth. The construction is such that the teeth will be securely held in the ring both against longitudinal and rotative movement in their sockets.

After the teeth have been mounted as described in said head, the head may be mounted on a spindle of a machine to be described, and the portions 14 of the teeth may be reduced by rotating the head relatively to a suitable forming tool. Since the longitudinal axes of the blanks are oblique to the axis of the head, the tapered end portions of the blanks will be dressed down to furnish the proper clearance at the ends and opposed concave and convex profiles of the teeth, when they are set parallel in the cutting head.

To give the concave faces of the teeth their proper clearance by another method, they may be mounted in a ring 21 (Figs. 5 and 7) which may be similar in construction to the ring 5 described, with the exception that the bores or sockets for receiving the teeth shanks instead of being oblique to the axis of the head, are parallel thereto. The shanks of the teeth should be held in the sockets in a position of rotative adjustment, so that when the head is rotated past a suitable tool, the concave profiles of the teeth will be formed with the rake or clearance desired. To accomplish this, in the present instance, the sockets may have rectangular enlargements 23 appropriate to receive shims 25 having faces 27 transversely inclined at an angle appropriate to produce the clearance required for the concave faces of the teeth. These wedge-shaped shims may engage the slabbed off faces 13 of the shanks of the teeth blanks, and may be held by screws 29 threaded in bores in the ring 21 communicating with the sockets.

When the teeth blanks have been mounted in the ring 21 as described, the head carrying said ring may be rotated relatively to the forming tool, thereby to form the concave faces of the teeth with the rake or clearance desired.

To form the convex faces of the teeth with the clearance desired, the wedge-shaped shims 25 are removed, and shims 31 (Fig. 6) may be substituted therefor. These shims are similar to those first described, with the exception that the faces 33 of the shims 31 incline in an opposite direction to the faces 27 of the shims 25. The construction is such that the teeth will be held at the appropriate angle to produce the required clearance for the convex faces of the teeth when rotated relatively to the forming tool.

The forming tool, in the present instance, comprises a body 47 (Figs. 4 and 1ª) having a bore 49 to permit the same to be mounted on a spindle to be described. Projecting from said body is a cutter 51 having an active cutting edge 53 with the form of a tooth space desired to be produced by the cutter. That is, the pitch circle 55 (Fig. 4) of the cutter 51 would have the same radius as the gear to be produced by the cutter formed by the tool.

The forming tool may be variously constructed but in the embodiment shown consists of a plurality of members 57 (Fig. 1ª) having active cutting edges 59. The members 57 may be held in proper registration by pins 61.

The construction is such that when the head carrying the teeth is rotated past the forming tool, the teeth will be progressively acted upon thereby and dressed or reduced to appropriate form. The forming tool should be given a rotary movement during the course of one rotation of the cutter head, through a space equal to the circular pitch of the gear to be formed by the cutter.

Any suitable mechanism may be provided for supporting the cutter head and the forming tool in proper relation and for imparting the relative movements thereto to dress or reduce the teeth to final form as described. One good form of mechanism for this purpose is shown in Fig. 1, and comprises a base 63 of appropriate form to support the instrumentalities to be described. Rising from the base 63 is an upright 65 carrying a bearing 67 in which is journaled a spindle 69. One end of this spindle is adapted to receive the cutter head 1, and the opposite end of said spindle has a gear 71 fast thereon meshing with a pinion 73 fast on a driving shaft 75 journaled in bearings in uprights rising from the base 63. At one end of the driving shaft 75 is a pulley 77 adapted to be driven by a belt from any suitable source of power.

To support the tooth forming tool 47 in operative relation with respect to the cutter, said tool may be mounted on a spindle 79 having a tapered end portion 81 adapted to be set with a tight friction fit in a bore in a vertical shaft 91 journaled in a bearing 93 projecting laterally from the base 63.

As above stated, while the cutter is given one complete rotation, the forming tool should receive a rotative movement equal to the circular pitch of the gear which is to be formed by the cutter. To impart this rotary movement to the tool, a gear 95 may be mounted fast on the vertical shaft 93 and mesh with a pinion 97 fast on a vertical countershaft 99 journaled in bearings in a casing 101 mounted on the base. A worm wheel 103 fast on the countershaft meshes with a worm 105 on a horizontal shaft 107 journaled in bearings in the casing 101. This horizontal shaft projects outward from said casing, where it receives a gear 109 meshing with and driven by a gear 111 fast on the driving shaft 75 referred to.

The construction is such that when the driving shaft is rotated, it will rotate the toothed cutter and the forming tool but the latter will be rotated at a much slower speed than the former. The relative speed of rotation of the spindles 69 and 79 is such that while the cutter 1 is rotated through an angle of 360°, the forming tool will move through an angle equal to the circular pitch of the gear to be formed by the cutter 1. The rotative movement of the forming tool relative to the teeth of the cutter 1 gives the teeth an involute configuration. As the tool moves past the rotating teeth it operates upon that portion of each tooth which is to be dressed, and after the tool has moved past the rotating teeth, the machine runs idle through a large number of rotations of the spindle 69, until the tool has been rotated by its gears through substantially a complete revolution, and is again brought opposite the teeth of the cutter head. If the cutter head 1 has been fed by the handwheel 121 toward the tool while the latter was out of engagement therewith, each tooth will be further dressed as the tool again moves past them. In this manner the teeth are cut until they are given the required configuration.

It is desirable relatively to move the forming tool and tooth cutter in a direction of approach in the course of the rotation thereof, until the full depth of the tooth space of the forming tool has acted on and dressed the teeth of the cutter. To accomplish this, in the present instance, the upright 65 carrying the cutter spindle 69 is mounted on a dove-tail 113 sliding in a similar shaped groove 115 in the base. A lug 117 depending from the dove-tail 113 is tapped to receive a screw 119 journaled in a bearing in the base, but confined against axial movement with respect thereto. At the outer end of said screw 119 is a hand wheel 121. The construction is such that the hand wheel 121 may be turned to move the upright 65 and the tooth cutter toward and from the forming tool as desired.

In the practice of the method, the cutter head is mounted on the spindle 69, and the forming tool is mounted on the spindle 79. The spindles are then rotated by the means described, and the cutter head is fed gradually toward the forming tool. This feeding may be done either by hand or by power as may be desired.

In the operation of dressing scroll cutters, as described, the angle of the center line of the cutting portion of the cutter teeth with the axis of rotation is varied as the distance of the scroll cutter teeth from the center of the cutter varies, so that the center line of cutter teeth will always be radial to the center of rotation of the tooth dressing tool; this produces a cutter, all the teeth of which will be radial to the gear or blank, being cut as shown in Fig. 8. In other words, the center line of the dressed scroll teeth of the cutter do not extend parallel to the axis of rotation of the cutter, but each center line extends in the direction of the axis of the gear 127 which is being cut. The cutter will progressively act on the teeth carried by the head and dress or reduce the active cutting edges of the teeth to final form. In the course of a single rotation of the cutter head, the forming tool will be rotated a distance equal to the circular pitch of the tool, and in the forming tool shown, movement of the tool through this distance will turn the tool in its rotary orbit practically clear of the cutter teeth. The tool rotating mechanism may be speeded up so as to bring the tool quickly around into position again to engage the cutter teeth. Whereupon said mechanism may be slowed down to its proper cutting speed. These operations are continued until the teeth of the cutter are reduced to final form.

Since a different forming tool is required for dressing down the teeth of different cutters for producing teeth on different sized gear blanks, it is desirable for the sake of economy to employ a forming cutter having a single tooth space such as described.

After the scroll cutter has been formed by the forming tool as described, when it is desired to employ the cutter thus formed to produce teeth on gear blanks having spaces between them corresponding to the tooth space of the forming tool, the teeth, if provided with round shanks may be mounted in a ring 123 (Figs. 2 and 3) having sockets 125 extending parallel to the axis of the ring, and the latter may be mounted on the head 1 in place of the ring used in the process of dressing the teeth to final form with proper clearance, but if the teeth are provided with square shanks as shown in Fig. 8 they may be mounted in the ring 123ª provided with correspondingly shaped sockets 125ª. Then a gear blank 127 (Fig. 8) is substituted in place of the forming tool on the spindle 79, and the machine is operated as described before. The cutter will act on the gear blank and progressively form tooth spaces in the periphery thereof with a continuous indexing action, and the cutter will be gradually fed toward the blank until teeth spaces of the required depth are formed therein.

The cup and scroll cutters formed in accordance with the method described are for the production of gear teeth having curved faces. Referring now more particularly to Figs. 9–12, the invention also contemplates the production of cutter teeth having rake or clearance for the production of spur gears having substantially straight faces. For this purpose, a head 129 (Fig. 11) may be provided having sockets 131 inclined somewhat with respect to radii of the head, and teeth 133 may be mounted in said sockets and held at the desired distance from the axis of the head by screws 135 which may be tapped into the teeth and have heads adapted to bear on ratchet-like facets 137 of the head, said screws being provided with lock nuts 139 to hold the screws in their positions of adjustment. When the head is rotated and the teeth are moved in an orbital path with respect to a suitable forming tool, the ends and opposed faces of the teeth will be dressed or formed with the proper clearance owing to the oblique positions of the teeth described. After the teeth have been thus formed, they may be reversed in their sockets, so that the advance acting cutting edges thereof will face in the opposite direction as indicated in Fig. 12. The teeth will now be in proper position so that when rotated with respect to a gear blank, they will have the proper rake or clearance for forming spur gear teeth on the blank.

In some instances, after the teeth have been formed with the rake or clearance, it may be desired, to mount them in a head 141 (Figs. 9 and 10) which may be similar to the head 129 described, with the exception that the sockets in the teeth have positions truly radial with respect to the axis of the head instead of inclined somewhat with respect to the radii, as shown in Figs. 11 and 12.

In the use of the cutter thus formed, the head can be mounted on a spindle and rotated by a suitable mechanism, and the gear blank may be mounted on a mandrel which may have a slight rotary motion as the cutter acts on the gear blank to produce involute teeth. The cutter will be employed to form one tooth space in the blank, and then the latter will be indexed and another tooth space in the blank will be formed, and so on until all of the tooth spaces required on the blank are produced.

A grinding wheel or abrading tool may be used to finish the teeth after same are tempered as the dressing of spiral and cup cutters is done on circular lines concentric with the axis of the cutter head, and the teeth of spur cutters may be of rack tooth shape with substantially flat sides.

It will be understood that the invention is not limited to the specific method described, and that various deviations may be made therefrom without departing from the spirit and scope of the appended claims.

What is claimed is:

1. A method of making cutters for the production of curved teeth of gears, characterized by moving tapered portions of a series of teeth in an orbital path past a tool having a cutter of tooth-space form, while holding the teeth shanks to extend in the same general direction and oblique to the axis of said orbital path to give said tapered portions clearance angles, and relatively moving said teeth and tool in a direction of approach to dress said tapered portions to final form suitable for cutting teeth spaces in a blank having the form of the tooth space of said tool.

2. A method of making scroll cutters for the production of curved teeth of gears, characterized by moving a series of teeth of spiral disposition in an orbital path about the axis of the spiral and relatively to the plane of a tooth forming tool having a standard tooth space cutting edge, and imparting a rotary motion to the forming tool to index said tool.

3. A method of making gear cutters, characterized by moving a series of cutter teeth in an orbital path relatively to a standard tooth space cutter tool, while holding the teeth at angles to give them clearance angles when reduced to final form by said tool, and then holding the teeth to project in the same direction and parallel to the axis of said orbital path, that they may cut tooth spaces in a gear blank having the form of the tooth space of said cutter tool.

4. The method of making scroll cutters for the production of curved teeth of gears, characterized by moving a series of teeth of spiral disposition in an orbital path about the axis of the spiral and relatively to the plane of a tooth forming tool having a standard tooth space cutting edge, turning the forming tool relatively to the part to be cut, and relatively moving said teeth and tooth forming tool bodily in a direction of approach.

5. The method of making scroll cutters for the production of curved teeth of gears, characterized by holding a series of spirally disposed teeth at a clearance angle while moving them in an orbital path about the axis of the spiral and relatively to a tooth forming tool, turning the forming tool relatively to the part to be cut, and then holding the spirally disposed teeth at a different angle with the cutting faces of the teeth in cutting position.

6. The method of making a rotary cutter for forming the teeth of involute gears, characterized by holding cutter teeth at an angle for giving the same clearance, moving the teeth while thus held in an orbital path and relatively to a tooth forming tool, imparting a rotary motion to the forming tool to dress the cutter teeth to cut involute gear teeth, and then holding the cutter teeth at a different angle with the cutting faces of the teeth in cutting position.

7. The method of making a rotary cutter for forming the teeth of gears, characterized by holding cutter teeth at an angle for giving the same clearance while being reduced by a forming tool, imparting a rotary motion to the forming tool relative to the cutter teeth to further dress the teeth, and then holding the teeth at a different angle with the cutting faces of the teeth in cutting position.

8. The method of making a rotary cutter for forming the teeth of gears, characterized by holding cutter teeth at an angle to give the same clearance, moving the teeth while thus held in an orbital path and relatively to a tooth forming tool, imparting a relative rotating movement to the tooth forming tool and cutter teeth at an angle to the plane of said orbital path to dress the cutter teeth, and then holding the teeth at a different angle with the cutting faces of the teeth in cutting position.

In testimony whereof, I have signed my name to this specification.

WILLIAM C. FARNUM.